No. 711,207. Patented Oct. 14, 1902.
M. V. GROGAN.
CIRCULAR HANDSAW.
(Application filed Dec. 14, 1901.)
(No Model.)
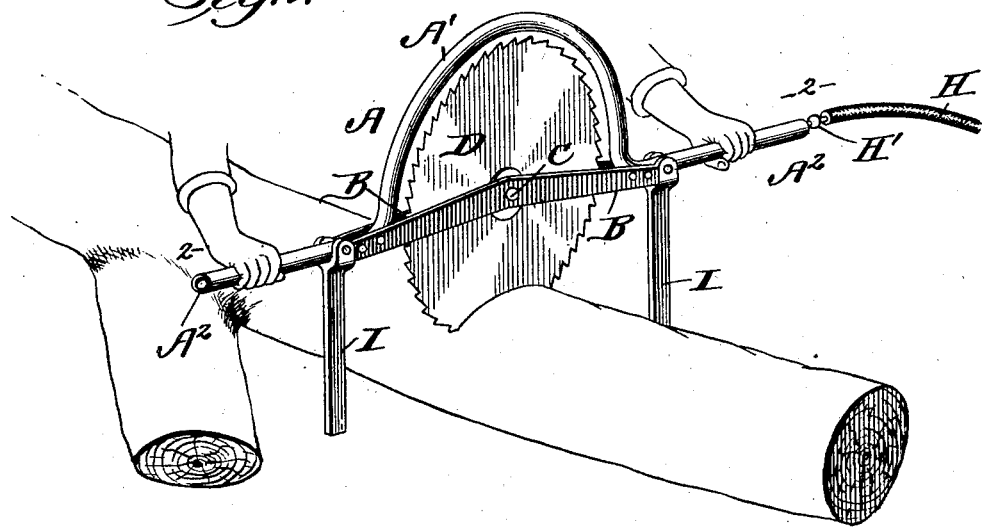
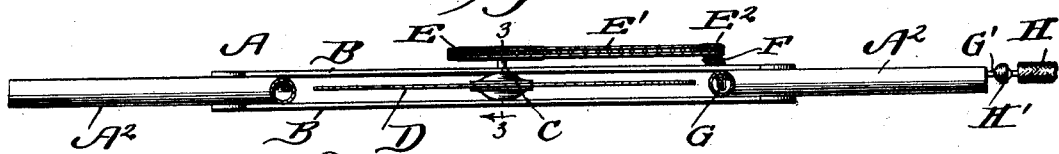
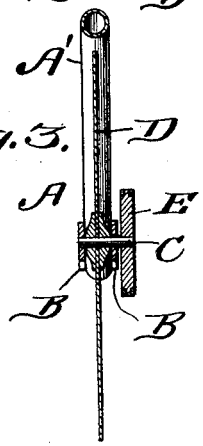
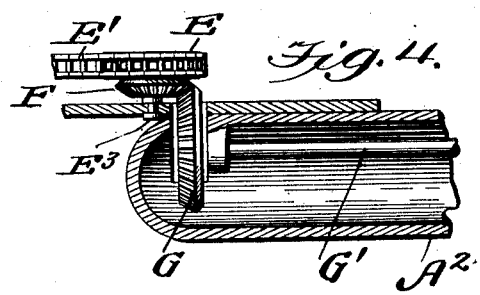
Inventor
Martin V. Grogan,
Witnesses

UNITED STATES PATENT OFFICE.

MARTIN V. GROGAN, OF WINSTON SALEM, NORTH CAROLINA.

CIRCULAR HANDSAW.

SPECIFICATION forming part of Letters Patent No. 711,207, dated October 14, 1902.

Application filed December 14, 1901. Serial No. 85,915. (No model.)

*To all whom it may concern:*

Be it known that I, MARTIN V. GROGAN, a citizen of the United States, residing at Winston Salem, in the county of Forsyth and State of North Carolina, have invented a new and useful Circular Handsaw, of which the following is a specification.

This invention is an improvement in circular handsaws, and has for its object to provide a simple, inexpensive, and efficient portable device for cutting logs and the like; and with this object in view my invention consists in certain details of construction and novel combinations and arrangements of parts, as will be fully described in the following specification and pointed out in the claims, reference being had to the drawings, in which—

Figure 1 is a perspective view of my improvement as in use. Fig. 2 is a sectional elevation taken about on the line 2 2 of Fig. 1. Fig. 3 is a cross-section on about line 3 3 of Fig. 2; and Fig. 4 is a detail view, enlarged, illustrating the gears and a portion of the belt for operating the saw.

In the construction of my invention I employ a frame A, preferably made of tubular metal, having the central arched portion $A'$ and the horizontal handles $A^2$, to which are connected flat bars B, in which is mounted the shaft C, that carries a circular saw D, the saw being arranged between the bars B, and the axle projects a slight distance beyond one of the bars and has a sprocket-wheel E, mounted thereon over which runs a chain belt $E'$ that is driven by a smaller sprocket $E^2$, mounted upon a stub-shaft $E^3$, secured in the bar E and arranged near one of the handle portions of the frame A. This shaft $E^3$ also carries a beveled gear F, that meshes with a beveled gear G, carried by a drive-shaft $G'$, that is arranged in one of the handle-sections $A^2$, as shown. This shaft $G'$ may be driven in any suitable manner; but in practice I prefer to attach a flexible shaft thereto, which may be connected to any suitable form of motor, as desired.

The drawings represent a flexible shaft H, that is suitably covered and is connected to the shaft $G'$ by a universal joint $H'$, as shown.

In operation the handle-sections are grasped and the saw arranged in position to sever whatever the occasion requires, and in cases when a log of such size is being severed and requires a means for steadying the saw I employ stop-bars I, that are arranged upon the handles adjacent the bars B, which are designed to engage the side of the log and prevent the saw being drawn across the log through its own movement, and therefore hold it in a steady position, and which also serve to relieve the attendant of undue strain and fatigue during the operation of cutting logs of certain dimensions.

It will thus be seen that my invention is exceedingly simple in construction and can be manufactured at comparatively a small cost, and it will also be seen that my improvement will be found particularly advantageous in severing limbs from trees or cutting underbrush and the like, as it may be conveniently moved from place to place with but little trouble.

Having thus fully described my invention, what I claim as new, and desire to secure by Letters Patent of the United States, is—

1. A device of the kind described comprising a frame having a central arched portion and handle portions formed integral therewith, bars connected to the said frame and having a shaft journaled therein upon which is mounted a circular saw that is arranged between the bars, and means carried by the frame for operating the saw, substantially as shown and described.

2. A device of the kind described, comprising a frame having a central arched portion and handle portions, bars secured to the frame, a shaft carrying a saw journaled in the said bars and having a sprocket-wheel arranged upon one end thereof, a shaft arranged within one of the handle portions and carrying a beveled gear upon its inner end, a stub-shaft carried by one of the said bars and having a beveled gear that is arranged for engagement with the gear of the shaft arranged in the handle, the said stub-shaft also carrying a sprocket-wheel over which runs a belt that engages the sprocket carried by the saw-shaft and a flexible shaft connected to the outer end of the shaft arranged within the handle, substantially as shown and described.

3. A device of the kind described comprising a frame having a circular saw journaled therein, a shaft arranged within the frame and having its outer end connected to a flexible drive-shaft and its inner end provided with a beveled gear, a stub-shaft journaled in the frame and having a beveled gear that is arranged for engagement with the gear arranged within the frame, the said stub-shaft having a sprocket-wheel, a sprocket-wheel arranged upon the saw-shaft, a belt engaging the said sprockets, and stop-bars carried by the frame substantially as shown and for the purpose set forth.

MARTIN V. GROGAN.

Witnesses:
JOHN O. BRYANT,
DAVID H. HUDSON.